United States Patent
Liu et al.

(10) Patent No.: US 8,375,347 B2
(45) Date of Patent: Feb. 12, 2013

(54) DRIVEN METAL CRITICAL DIMENSION (CD) BIASING

(75) Inventors: Louis Chao-Chiuan Liu, Hsin-Chu (TW); Lee-Chung Lu, Taipei (TW); Yao-Ching Ku, Hsinchu (TW)

(73) Assignee: Taiwan Semiconductor Manufacturing Company, Ltd., Hsin-Chu ( * ) Notice: Subject to any disclaimer, the term of this patent is extended or adjusted under 35 U.S.C. 154(b) by 249 days.

(21) Appl. No.: 12/464,578

(22) Filed: May 12, 2009

(65) Prior Publication Data

US 2010/0293514 A1    Nov. 18, 2010

(51) Int. Cl.
*G06F 17/50* (2006.01)
(52) U.S. Cl. .......... 716/126; 716/110; 716/113
(58) Field of Classification Search .......... 716/123, 716/126
See application file for complete search history.

(56) References Cited

U.S. PATENT DOCUMENTS

| 2006/0026539 A1* | 2/2006 | Tetelbaum et al. ............ 716/2 |
| 2006/0132176 A1* | 6/2006 | Lewis ............................ 326/44 |
| 2009/0183132 A1* | 7/2009 | Izuha et al. ................... 716/10 |

FOREIGN PATENT DOCUMENTS

CN    1776698    5/2006

OTHER PUBLICATIONS

Yan, Jin-Tai; Chiang, Bo-Yi; Huang, Shi-Qin; "Width and Timing-Constrained Wire Sizing for Critical Area Minimization," 2006, IEEE.*
Leblebici, Yusuf, "CMOS Fabrication Technology and Design Rules," Nov. 10, 1998, <http://lsmwww.epfl.ch/Education/former/2002-2003/VLSIDesign/ch02/ch02.html>.*
Chinese Patent Office, Office Action dated Jun. 29, 2011, Application No. 200910253458.7, 4 pages.

* cited by examiner

*Primary Examiner* — Vuthe Siek
*Assistant Examiner* — Eric Lee
(74) *Attorney, Agent, or Firm* — Haynes and Boone, LLP

(57) ABSTRACT

A method of designing an integrated circuit ("IC") is provided that includes placing an IC design, where the IC design includes a first element, a second element, and a path coupling the first and second elements, and routing the IC design. Further, the method includes obtaining at least one of resistivity data and capacitance data related to the path, and obtaining timing data related to the path. The method also includes using at least one of the resistivity data, the capacitance data, and the timing data to determine a critical dimension ("CD") bias to be applied to the path, and modifying the IC design, where modifying includes applying the CD bias to the path.

20 Claims, 8 Drawing Sheets

DRIVEN METAL CRITICAL DIMENSION (CD) BIASING

BACKGROUND

Computer-Aided Design ("CAD") tools can improve the efficiency of the integrated circuit ("IC") design process. For example, CAD tools may assist an IC designer with defining the physical layout of an IC by enabling the IC designer to generate a virtual version of the physical layout. For example, a designer may use CAD tools to define paths and route IC elements. CAD tools may also assist a designer perform timing analysis.

An IC design may include one or more metal elements. Traditional IC designs may define a design rule that includes using a fixed metal width and a fixed spacing between two metal elements. For example, the design rule may include a 50-50 metal width to metal spacing design rule. According to a 50-50 ratio rule, the width of spacing between two metal elements is the same as the width of each of the metal elements.

Once a minimum width is defined, the corresponding design rule is applied to the entire design. However, using a fixed metal width may cause timing issues with respect to certain paths. For example, if the critical dimension ("CD") of a metal element is too small, then Resistivity ("R") may cause a timing issue. On the other hand, if the CD of a metal element is too large, then Capacitance ("C") may cause a timing issue. Thus, it would be beneficial to provide a way to enable the modification of a metal width during the design phase of an IC.

SUMMARY

One of the broader forms of an embodiment of the invention involves a method of designing an integrated circuit ("IC"). The method includes placing an IC design, wherein the IC design includes a first element, a second element, and a path coupling the first and second elements; routing the IC design; obtaining at least one of resistivity data and capacitance data related to the path; obtaining timing data related to the path; using at least one of the resistivity data, the capacitance data, and the timing data to determine a critical dimension ("CD") bias to be applied to the path; and modifying the IC design, wherein the modifying includes applying the CD bias to the path.

Another one of the broader forms of an embodiment of the invention involves a computer program product that includes a computer-readable medium, the medium having stored thereon instructions which, when executed by a processor, causes the processor to execute a method for designing an integrated circuit ("IC"). The computer program product includes a placing module operable to place an IC design, wherein the IC design includes a first element, a second element, and a path coupling the first and second elements; a routing module operable to route the IC design; an extraction module operable to obtain at least one of resistivity data and capacitance data related to the path; an analysis module operable to obtain timing data related to the path; a bias module operable to use at least one of the resistivity data, the capacitance data, and the timing data to determine a critical dimension ("CD") bias to be applied to the path, and apply the CD bias to the path.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The present disclosure relates generally to design of an integrated circuit ("IC"), and more particularly, to a defining a critical dimension ("CD") bias for a metal feature of an IC at design time. It is understood, however, that specific embodiments are provided as examples to teach the broader inventive concept, and one of ordinary skill in the art can easily apply the teaching of the present disclosure to other methods or apparatus. Also, it is understood that the methods and apparatus discussed in the present disclosure include some conventional structures and/or processes. Since these structures and processes are well known in the art, they will only be discussed in a general level of detail. Furthermore, reference numbers are repeated throughout the drawings for sake of convenience and example, and such repetition does not indicate any required combination of features or steps throughout the drawings.

Figure 1:
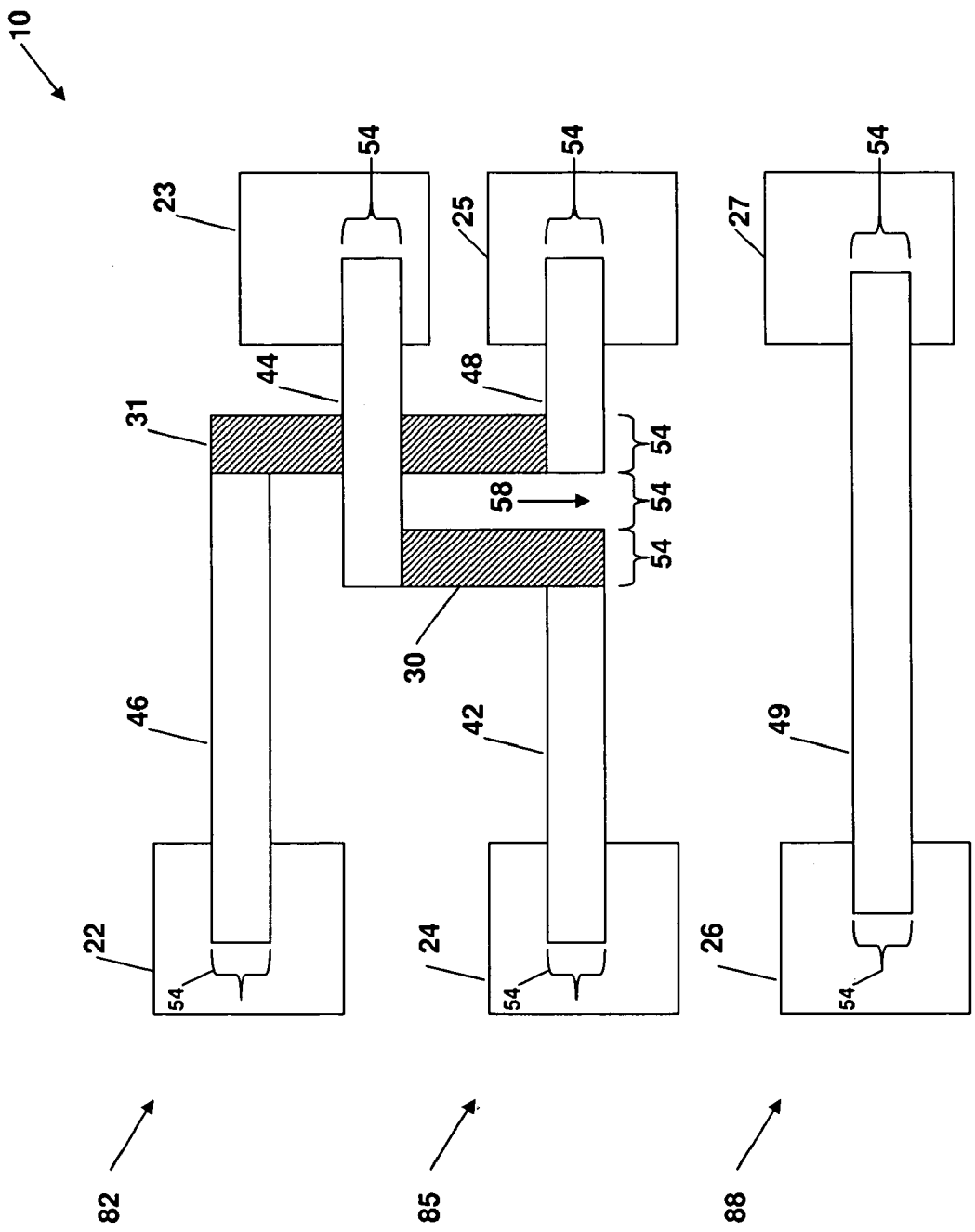
FIG. 1 is a diagrammatic schematic view of an exemplary embodiment of an integrated circuit design.

FIG. 1 shows a diagrammatic schematic view of an exemplary embodiment of an IC design 10. An IC design may include several IC design elements. The elements may include metal elements, non-metal elements, and paths that couple the various elements. In an exemplary embodiment, a path includes a single path segment. In another exemplary embodiment a path includes a plurality of path segments and a metal element.

The IC design 10 includes elements 22-27. The elements 22, 24, and 26 are positioned on one side of the IC design 10, and elements 23, 25, and 27 are positioned on the other side of the IC design. Further, the IC design 10 includes metal elements 30 and 31, which are positioned between elements 22, 24, 26 and elements 23, 25, 27.

A path segment 46 couples element 22 to metal element 31. A path segment 42 couples element 24 to metal element 30. A path segment 44 couples element 23 to metal element 30. A path segment 48 couples element 25 to metal element 31. Finally, a path segment 49 couples element 26 to element 27

The width of an IC element may be referred to as a critical dimension ("CD") of the element. When an IC design places two metal elements according to a fixed 50-50 metal width to metal spacing design rule, the CD of each of the metal elements is the same, and the spacing between the metal elements is the same as the CD of each of the metal elements.

The IC design 10 shown in FIG. 1 is placed using a fixed 50-50 metal width to metal spacing design rule. The CD of metal elements 30, 31 are the same, and are represented by CD 54. A width of the space 58 between the metal elements 30, 31 is also equal to CD 54. Each of the path segments 42, 44, 46, and 48 has a width that is equal to CD 54. The path segment 49 also has a width that is equal to CD 54.

A "long" path includes a plurality of path segments and a metal element. For example, a long path 82 includes the combination of element 22, path segment 46, metal element 31, path segment 48, and element 25. Further, a long path 85 includes the combination of element 24, path segment 42, metal element 30, path segment 44, and element 23. A "short" path includes only one path segment. For example, a short path 88 includes the combination of elements 26, 27 and element path segment 49.

Figure 2:
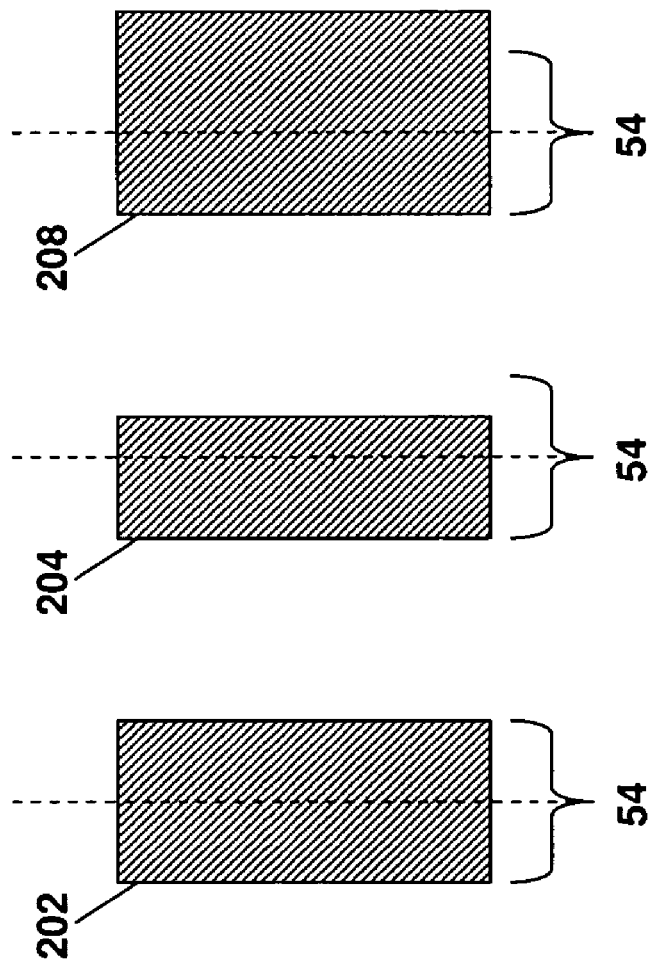
FIG. 2 is a diagrammatic schematic view of several exemplary embodiments of metal elements.

FIG. 2 is a diagrammatic schematic view of several exemplary embodiments of metal elements. During the design optimization stage, an IC design may require modification to meet certain design requirements. Design requirements may include timing requirements (e.g., setup and/or hold delay requirements), processing speed requirements, power requirements, and other performance criteria. For example, Resistivity ("R") may increase as the length of a path increases. Accordingly, an IC design might seek ways to lower the R of a path. An IC design may also seek ways to lower the Capacitance ("C") associated with a path, because a lower C may result in a reduced power requirement. Herein, R and C are collectively referred to as "RC".

IC design modifications may include modifying the CD of an element. The CD modification may also be referred to as "CD bias." Applying a CD bias to an element may include increasing or decreasing the width of the element. In one exemplary embodiment, CD bias may include (a) none (no modification to the CD), (b) positive bias (increasing the CD), and (c) negative bias (decreasing the CD). Metal element 202 is an exemplary embodiment of a metal element having a width that is equal to CD 54, similar to metal elements 30, 31 shown in FIG. 1. Metal element 204 shows an exemplary embodiment of metal element 202 with a negative bias applied. Metal element 208 shows an exemplary embodiment of metal element 202 with a positive bias applied.

Figure 3:
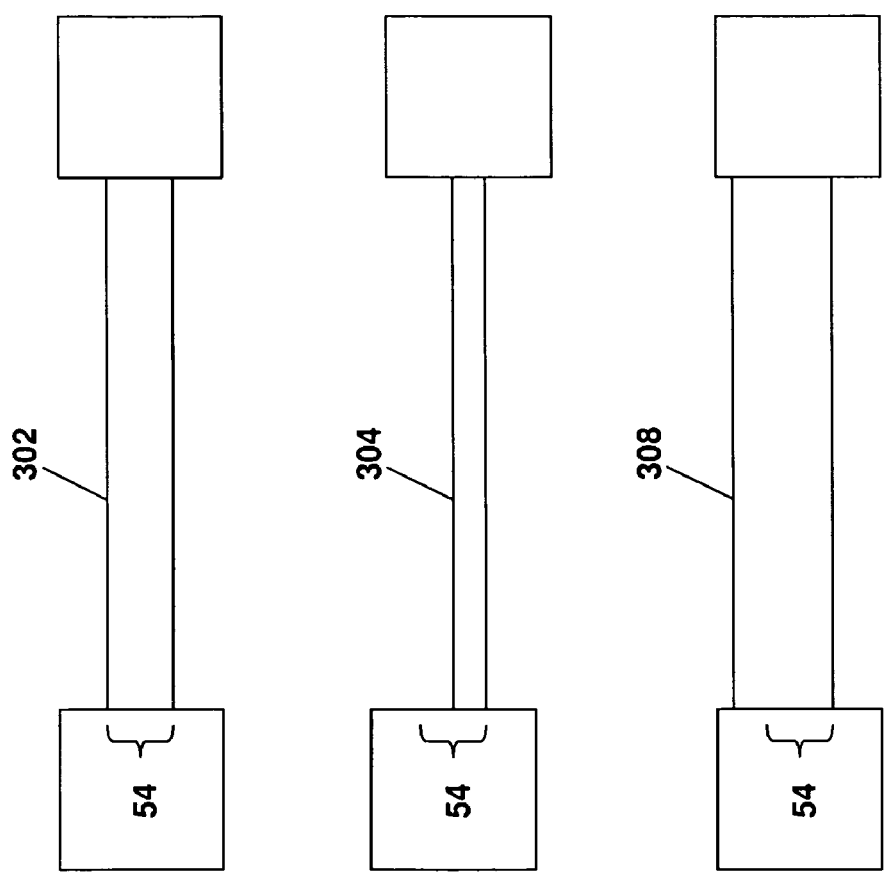
FIG. 3 is a diagrammatic schematic view of several exemplary embodiments of paths.

FIG. 3 is a diagrammatic schematic view of several exemplary embodiments of path segments 302, 304, and 308. In an exemplary embodiment, applying a CD bias to a path may also include applying the CD bias to each metal element of the path. In another exemplary embodiment, applying a CD bias to a path also includes applying the CD bias to each path segment of the path. Upon applying a CD bias to an element, it may be necessary to also apply a CD bias to the path segments that couple the biased element to other elements.

A path segment 302 is an exemplary embodiment of a path segment having a width that is equal to CD 54, similar to path segments 42, 46, and 49 shown in FIG. 1. A path segment 304 shows an exemplary embodiment of path segment 302 with a negative bias applied. A path segment 308 shows an exemplary embodiment of path segment 302 with a positive bias applied.

Figure 4:
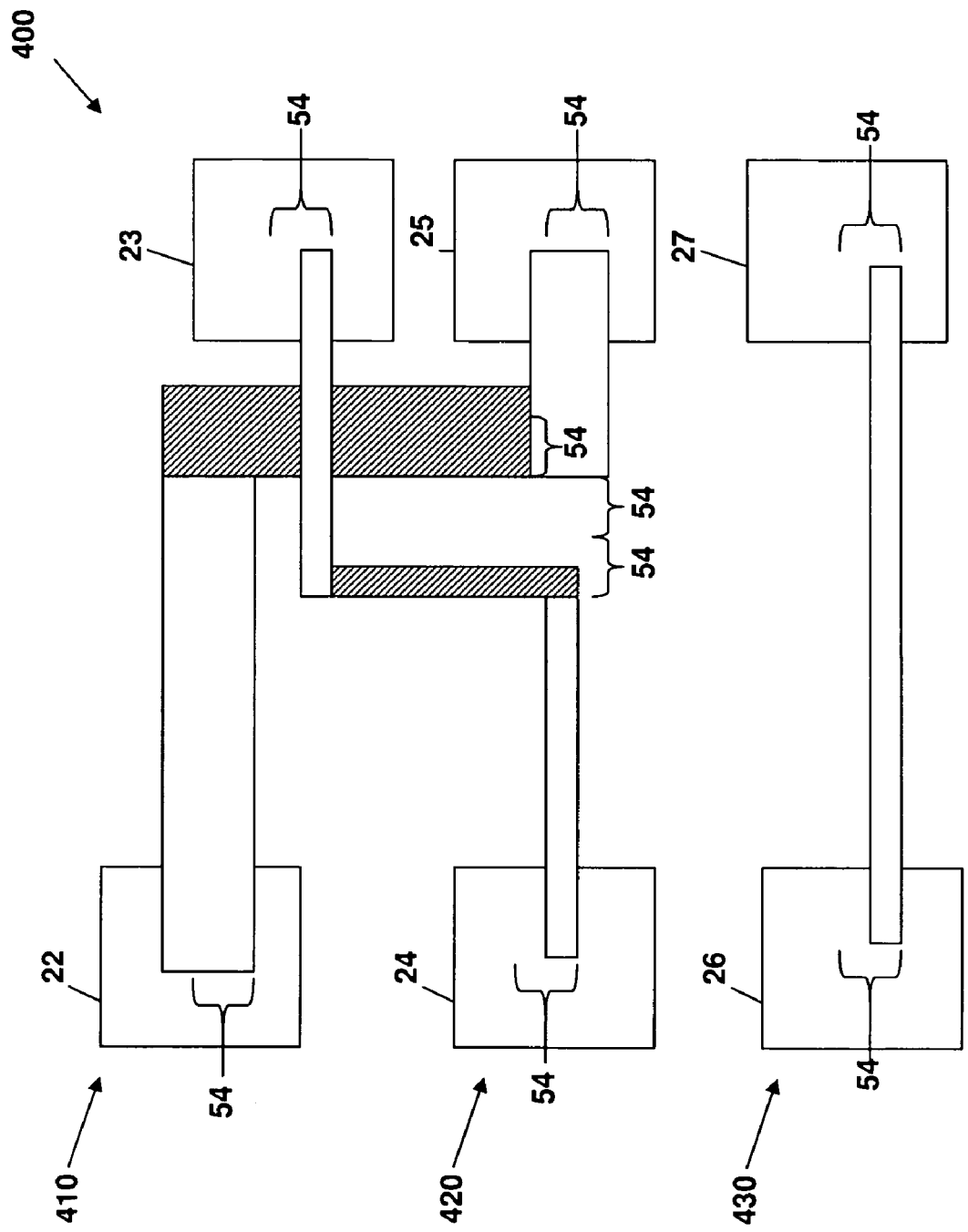
FIG. 4 is a diagrammatic schematic view of an exemplary embodiment of an integrated circuit design.

FIG. 4 is a diagrammatic schematic view of an exemplary embodiment of an IC design 400. The IC design 400 is similar to the IC design 10 of FIG. 1 except that CD bias has been applied to the design. Accordingly, similar features in FIGS. 1 and 4 are numbered the same for the sake of simplicity and clarity. The CD bias that may be applied to a path depends upon several factors. These factors include, but are not limited to, (a) whether the path is setup-critical or hold-critical, and (b) whether the path is short or long.

Each path in an IC design may have varying design requirements. If a path is a long path, then it is R dominated. On the other hand, if a path is a short path, then it is C dominated. CAD tools, such as RC-extraction tools and static timing analysis ("STA") tools, may be used to determine the CD bias that should be applied to an element. In an exemplary embodiment, RC-extraction includes analyzing the IC design, and generating an RC model of the IC design. STA tools compute the expected timing (e.g., worst-case delays) of an IC design using various techniques.

The IC design 400 layout is similar to the IC design 10 shown in FIG. 1. However, IC design 400 is different from IC design 10, because it reflects what IC design 10 would look like after applying a CD bias to each of the paths 82, 85, and 88 of FIG. 1. For example, a path 410 represents what the path would look like if a positive CD bias were applied to path 82 (increasing the CD of element 46, metal element 31, and element 48); a path 420 represents what the path would look like if a negative CD bias were applied to path 85 (decreasing the CD of element 42, metal element 30, and element 44); and a path 430 represents what the path would look like if a negative CD bias were applied to path 88 (decreasing the CD of element 49).

In the present embodiment, the path 410 is a long setup-critical path, the path 420 is a long non-critical path (i.e., a path that is neither setup-critical nor hold-critical), and the path 430 is a short setup-critical path. A setup-critical path requires that a path of the path meets a setup delay requirement. The setup delay is a time duration that a signal must be available at an input to a cell prior to a respective clock or other signal transition. Setup violations occur when a signal arrives too late, and misses the time when it should advance.

A setup-critical path that exhibits a setup violation may benefit from reducing the setup delay of the path. If a setup-critical path is long, then applying a positive CD bias to the path may reduce the R of the path while maintaining the speed of the path. Reducing the R of such a path may in turn reduce the setup delay of the path. Accordingly, the path 410 has a lower R as compared to path 82, and path 410 also has a lower setup delay than path 82, but maintains substantially the same speed as path 82.

A non-critical path may benefit from reduced power requirement. Applying a negative CD bias to a non-critical path may reduce the C of the path without violating path timing requirements. Reducing the C of a non-critical path may in turn reduce the power requirement of the path. Accordingly, the path 420 has a lower C and lower power requirement as compared to path 85.

Additionally, if a setup-critical path is a short path, then applying a negative CD bias to the setup-critical short path may reduce the C of the path. Reducing the C of a short path may in turn lower the setup delay of the path. Further, applying a negative CD bias to a setup-critical short path may lower the power requirement and increase the speed of the path. Accordingly, the path 430 has a lower C as compared to path 88, and path 430 also has a shorter setup delay, lower power requirement, and higher speed as compared to path 88.

Figure 5:
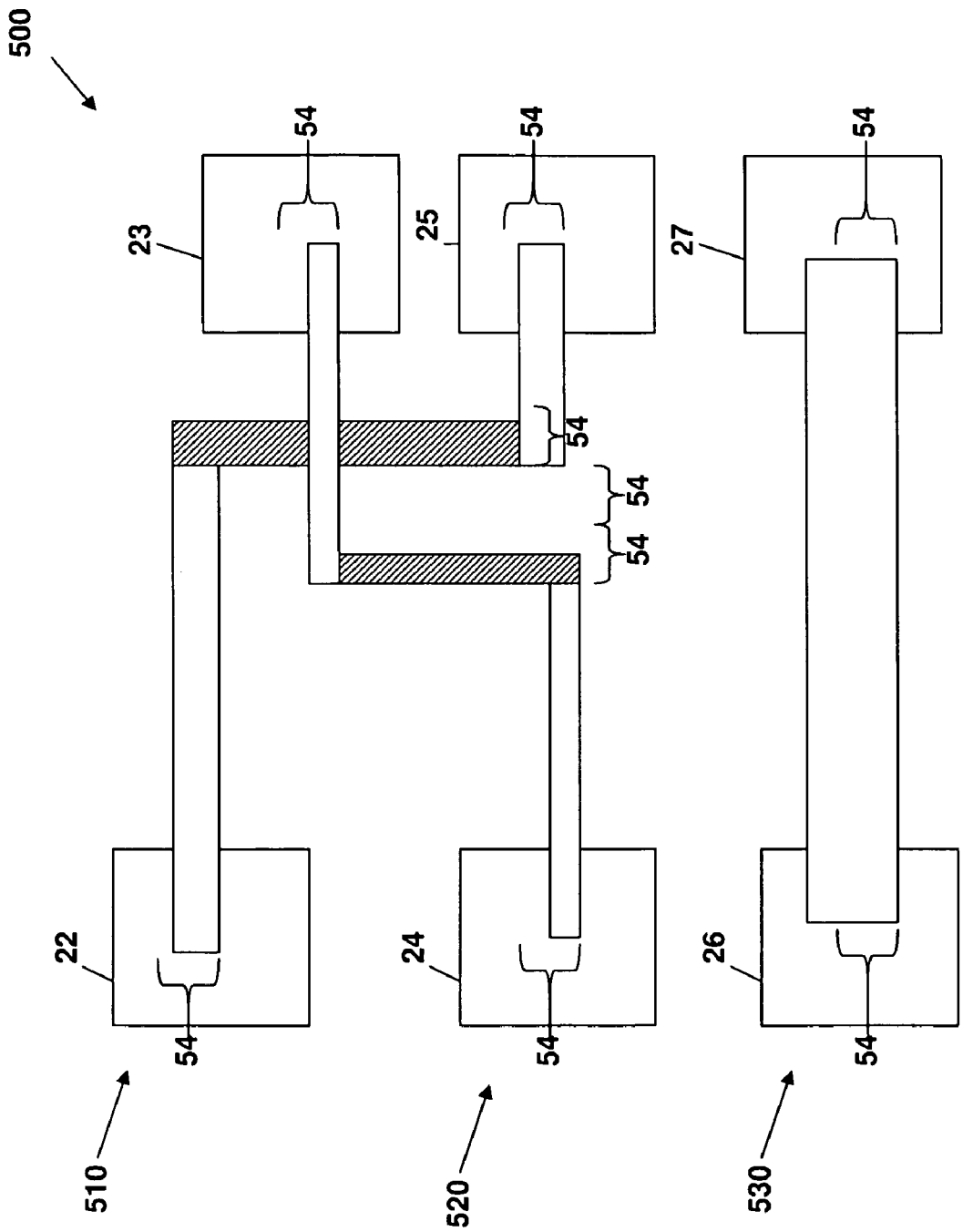
FIG. 5 is a diagrammatic schematic view of an exemplary embodiment of an integrated circuit design.

FIG. 5 is a diagrammatic schematic view of an exemplary embodiment of an IC design 500. The IC design 500 layout is similar to the IC design 10 shown in FIG. 1. Accordingly, similar features in FIGS. 1 and 5 are numbered the same for the sake of simplicity and clarity. However, IC design 500 is different from IC design 10, because it reflects what IC design 10 would look like after applying a CD bias to each of the paths 82, 85, and 88 of FIG. 1. For example, a path 510 represents what the path would look like if a negative CD bias were applied to path 82 (decreasing the CD of element 46, metal element 31, and element 48); a path 520 represents what the path would look like if a negative bias were applied to path 85 (decreasing the CD of element 42, metal element 30, and element 44); and a path 530 represents what the path would look like if a positive bias were applied to path 88 (increasing the CD of element 49).

In the present embodiment, the path 510 is a long hold-critical path, the path 520 is a long non-critical path, and the path 530 is a short hold-critical path. A hold-critical path requires that a path of the path meets a hold delay requirement. The hold delay is the time duration that a signal must be stable after a respective clock or other signal transition. Hold violations occur when a signal arrives too early, and advances one clock cycle before it should.

A hold-critical path that exhibits a hold violation may benefit from increasing the hold delay of the path so that the hold delay meets timing requirements. If a hold-critical path is a long path, then applying a negative CD bias to the path increases the R of the path. Increasing the R of a long hold-critical path in turn increases the hold delay of the path, which may thereby fixing the hold violation. Thus, if path 82 was a long hold-critical path that exhibited a hold violation, then applying a negative CD bias to path 82 to achieve path 510 may fix the hold violation exhibited by path 85.

As discussed above with reference to FIG. 4, a non-critical path may benefit from reduced power requirement. Applying a negative CD bias to a non-critical path may reduce the C of the path without violating path timing requirements. Reducing the C of a non-critical path may in turn reduce the power requirement of the path. Accordingly, the path 520 has a lower C and lower power requirement as compared to path 85.

Applying a positive CD bias to a hold-critical short path may increase the C of the path. Accordingly, the path 530 has higher C as compared to path 85. Increasing the C of a hold-critical short path in turn increases the timing delay of such an path, which may thereby remedy the hold violation. Thus, if path 85 was a hold-critical short path that exhibited a hold violation, then applying a positive CD bias to path 85 to achieve path 530 may fix the hold violation exhibited by path 85.

Enabling an IC designer to define CD bias when designing an IC allows the designer to tune the R and C of a path depending on the speed and/or power requirements of each specific path. Experimental results have shown that applying design-driven CD bias to IC design may result in benefits such as reducing IC power requirement by as much as 20%, and increasing IC performance by about 5-10%, as compared to an IC design that does not make use of design-driven CD bias. It should be noted that the various characteristics of the paths described in FIGS. 4 and 5 are mere examples, and that other paths of an IC design with different characteristics can also benefit from design-driven CD biasing without departing from the scope and spirit of the present disclosure.

Another potential advantage of applying design-driven CD bias is that it provides IC designers with an additional factor that may be used to tune a IC to meet setup and/or hold time requirements. This could shorten the design cycle time, and may also reduce any need for insertion of additional buffer saving area and power. It is understood that different embodiments disclosed herein offer different advantages, and that no particular advantage is necessarily required for all embodiments.

Figure 6:
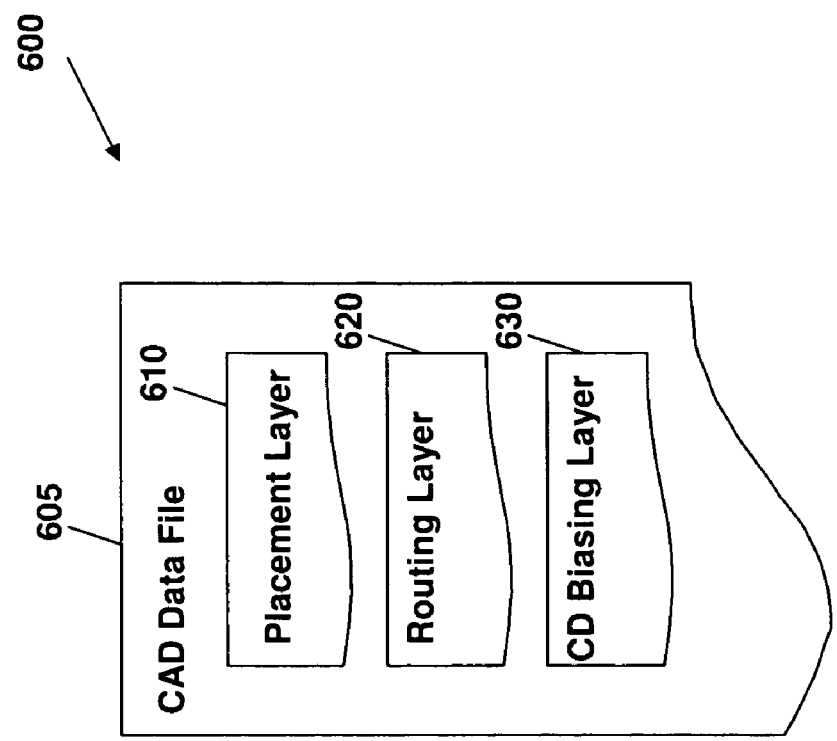
FIG. 6 is a diagrammatic schematic view of an exemplary embodiment of a manufacturing design specification.

FIG. 6 is a diagrammatic schematic representation of an exemplary embodiment of a manufacturing design specification 600. An IC design may be encoded into the manufacturing design specification 600. According to an exemplary embodiment, the manufacturing design specification may be in the form of a CAD data file 605. The CAD data file 605 may include one or more data layers. The data contained in each data layer may include specifications for the IC design. For example, the CAD data file 605 may include a placement layer 610, a CD biasing layer 630, and a routing layer 620.

The placement layer 610 may include data about the placement of IC elements according to an IC design. The routing layer 620 may include information for routing path segments between the elements of the IC design. CD bias data may be encapsulated in the CD biasing layer 630. For example, in an exemplary embodiment, the CD biasing layer 630 may include CD bias information for each path of the IC design. The CD bias data encapsulated in the CAD data layers may be used to achieve the required CD bias during silicon processing.

The CAD data file 605 is just an exemplary embodiment of a manufacturing design specification. That is, CD biasing information may be encapsulated in any number of formats. The CAD data file 605 may be used during logic design operations and optical proximity correction ("OPC") operations.

Figure 7:
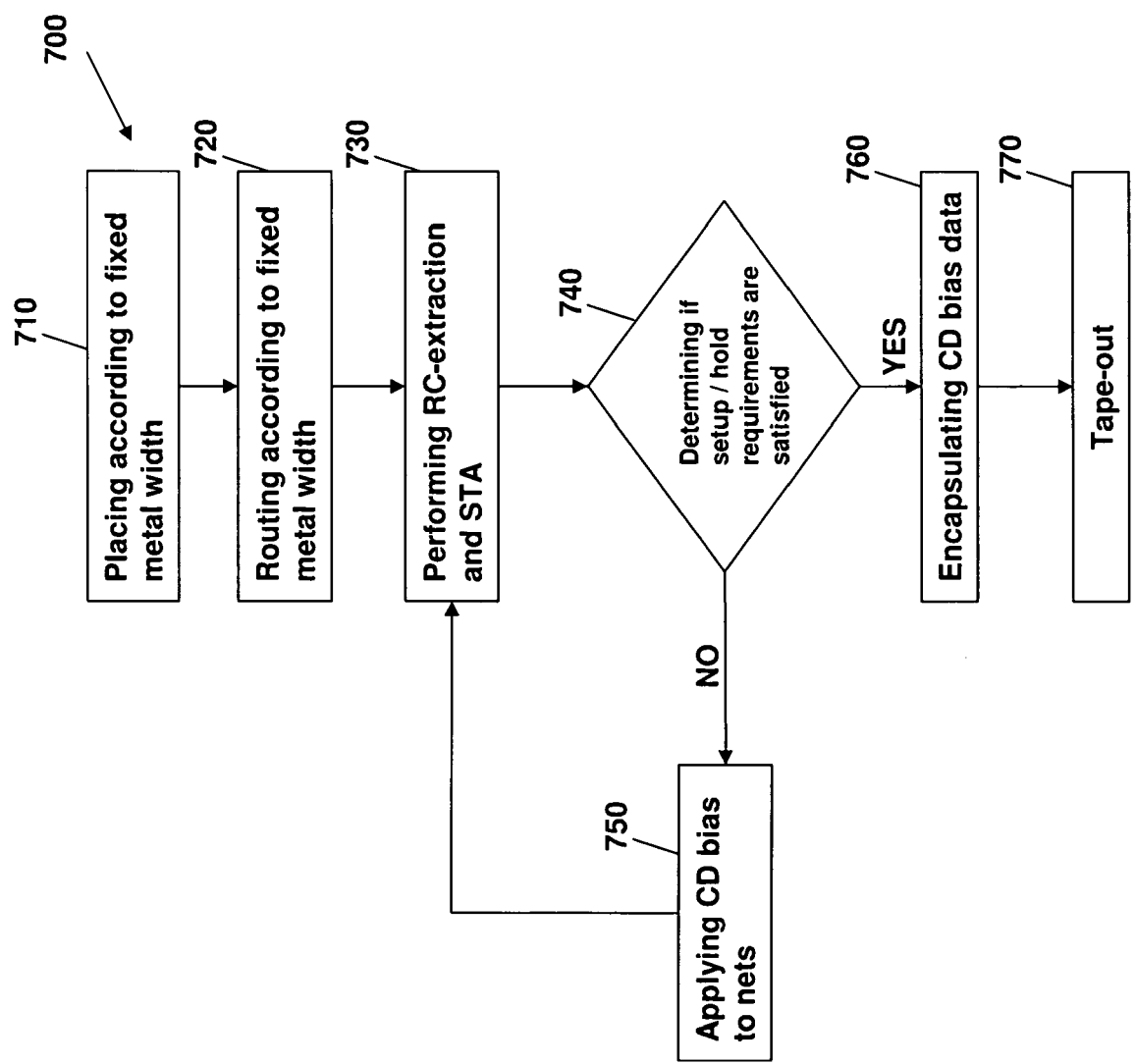
FIG. 7 is a flowchart of an exemplary embodiment of a method for modifying an integrated circuit design.

FIG. 7 is an exemplary embodiment of a method 700 for modifying an IC design. The method 700 begins with block 710 which involves placing an IC design using a fixed metal width rule, such as a 50-50 metal width to metal spacing design rule. The method 700 continues with block 720 in which the IC design is routed using the fixed metal rule. The method 700 continues with block 730 in which RC-extraction and STA tools may be used to obtain IC design metric data. The method 700 continues with block 740 in which the IC design metric data obtained in block 730 may be used to determine whether paths defined by the IC design meet setup and/or a hold delay requirements. If any of the paths do not meet the setup and/or hold time requirements, the method 700 continues with block 750 in which a CD bias may be applied to those paths.

Blocks 730, 740, and 750 may be repeated until all setup and/or hold time requirements have been met. Once all setup/hold time requirements are satisfied, the method 700 proceeds to block 760 in which the CD bias data is encapsulated in a manufacturing design specification, such as a CAD data file. The method 700 continues with block 770 in which the modified IC design proceeds to a tape-out process.

While different steps, processes, and procedures are described as appearing as distinct acts, it is understood that the steps, process, and procedures could also be performed in different orders, simultaneously, or sequentially. Additionally, the steps, processes, and procedures could be merged into one or more steps, processes, or procedures.

Figure 8:
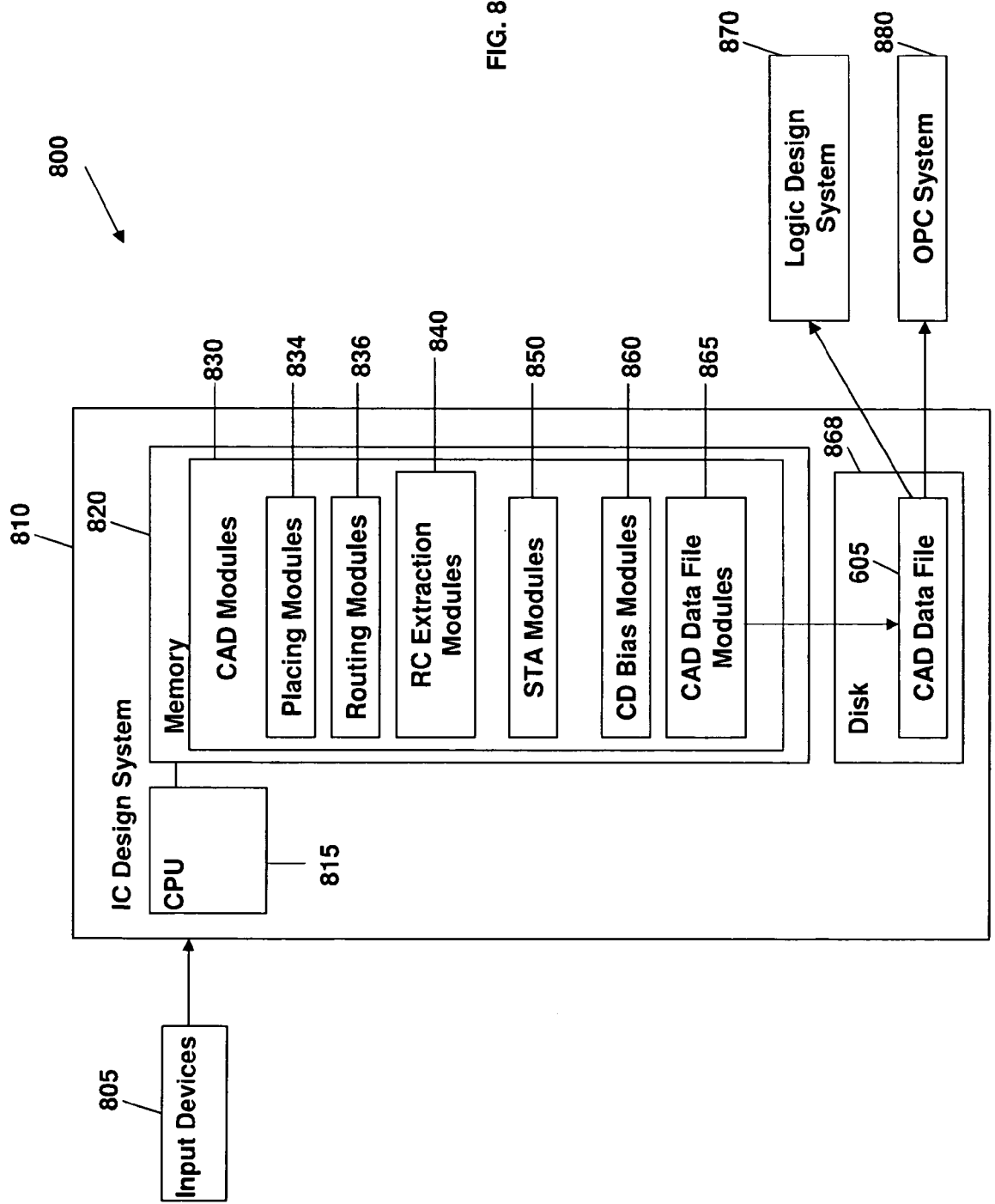
FIG. 8 is a diagrammatic schematic view of an exemplary embodiment of a system 800 for modifying an IC design.

FIG. 8 is a diagrammatic schematic view of an exemplary embodiment of a system 800 for modifying an IC design. In an exemplary embodiment, one or more of the blocks of the method 700 in FIG. 7 are implemented in software modules for execution by various types of processors. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

An identified module of executable code may, for instance, include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module.

According to an exemplary embodiment, the system 800 includes input devices 805 that are communicably coupled to an IC design system 810. The input devices 805 provide input signals to the IC design system 810. Input devices 805 may include a mouse, a keyboard, or any traditional input device that is used with a computer.

The IC design system 810 is a computer having a CPU 815, memory 820, and a disk 868. The CPU 815 is any traditional or commercially-available processor that is configured to execute software modules. The memory 820 may include random access memory (RAM) configured to store data and software modules. However, any computer-readable medium capable of storing software modules may be used for the memory 820. Computer-readable mediums include passive data storage, such as a random access memory (RAM) as well as semi-permanent data storage such as a compact disk read only memory (CD-ROM), floppy drives, hard drives, flash memory, and network drives.

CAD modules 830 are stored in the memory 820. The CAD modules 830 include various modules that support IC design, including placing modules 834, routing modules 836, RC extraction modules 840, STA analysis modules 850, CD bias modules 860, and CAD data file modules 865.

The disk 868 is a computer-readable medium. The disk 868 stores the CAD data file 605, an exemplary embodiment of which was described in FIG. 6.

The IC design system 810 is communicably coupled to a logic design system 870 and an optical proximity correction ("OPC") system 880. The coupling may be via a network link, radio link, or any other traditional communication coupling.

In an exemplary operation of the system 800, an IC designer interacts with the IC design system 810 via the input devices 805. The CPU 815 executes CAD modules 830. The CAD modules 830 are configured to carry out the steps of method 700 shown in FIG. 7. For example, placing modules 834 and routing modules 836 carry out blocks 710 and 720, respectively. The RC extraction modules 840 and STA modules 850 carry out block 730. The CD bias modules 860 carry out blocks 740 and 750. Finally, the CAD data file modules 865 carry out block 760.

The CAD data file modules 865 output the CAD data file 605 shown in FIG. 6, and store the CAD data file 605 as a data structure to the disk 868. Data structures are defined organizations of data. For example, a data structure may provide an organization of data, or an organization of executable code.

The IC design system 810 provides the CAD data file 605 to the logic design system 870 and OPC system 880 for further processing. Several methods for providing the CAD data file 605 are possible, including transfer via network, a computer-readable medium, or any other traditional means of transferring a data structure.

The system 800 may be designed to work on any specific architecture. For example, the system may be executed on a single computer, local area networks, client-server networks, wide area networks, internets, hand-held and other portable and wireless devices and networks. Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the present disclosure as possible equivalent structures and equivalent methods.

Although only a few exemplary embodiments of this invention have been described in detail above, those skilled in the art will readily appreciate that many modifications are possible in the exemplary embodiments without materially departing from the novel teachings and advantages of this disclosure.

What is claimed is:

1. A method of designing an integrated circuit ("IC"), comprising:
   placing an IC design, wherein the IC design includes a first element, a second element, and a path coupling the first and second elements;
   routing the IC design;
   obtaining at least one of resistivity data and capacitance data related to the path;
   obtaining timing data related to the path;
   determining whether the path is a long path or a short path, wherein determining whether the path is the long path or the short path includes determining whether the path has only one path segment extending from only a first element to only a second element and determining that the path is the short path when the path has only one path segment extending from only the first element to only the second element, wherein the long path having more path segments than the short path;
   determining whether the path is a setup-critical path or hold-critical path;
   determining, by using a computer, a critical dimension ("CD") bias to be applied to the path based upon at least one of the resistivity data, the capacitance data, and the timing data and based upon whether the path is determined the short path or the long path and whether the path is determined the setup-critical path or the hold-critical path; and
   modifying the IC design, wherein the modifying includes applying the CD bias to the path.

2. The method of claim 1, further comprising encoding data related to the CD bias to a data file.

3. The method of claim 2, wherein encoding the data related to the CD bias to a data file includes encoding data related to the CD bias to a computer-aided design ("CAD") file.

4. The method of claim 1, wherein the obtaining at least one of resistivity and capacitance data includes performing resistivity and capacitance extraction analysis on the path.

5. The method of claim 1, wherein the obtaining timing data includes performing static timing analysis ("STA") on the path.

6. The method of claim 1, wherein the path further includes a plurality of metal elements; and
   wherein the placing and the routing includes placing and routing the plurality of metal elements according to a 50-50 metal width to metal spacing design rule.

7. The method of claim 1, wherein the path includes a metal element, a first path segment that couples the metal element to the first element, and a second path segment that couples the metal element to the second element;
   wherein the path is determined the long path and the setup-critical path, and the path does not satisfy a setup delay requirement; and
   wherein the CD bias is positive, and applying the CD bias includes applying the positive CD bias to each of the first and second path segments and the metal element in a manner such that the path satisfies the setup delay requirement.

8. The method of claim 1,
wherein the path is determined the short path and the setup-critical path, and the path does not satisfy a setup delay requirement; and
wherein the CD bias is negative, and applying the CD bias includes applying the negative CD bias to the single path segment in a manner such that the path satisfies the setup delay requirement.

9. The method of claim 1, wherein the path includes a metal element, a first path segment that couples the metal element to the first element, and a second path segment that couples the metal element to the second element;
wherein the path is determined the long path and the hold-critical path, and the path does not satisfy a hold delay requirement; and
wherein the CD bias is negative, and applying the CD bias includes applying the negative CD bias to each of the first and second path segments and the metal element in a manner such that the path satisfies the hold delay requirement.

10. The method of claim 1,
wherein the path is determined the short path and the hold-critical path, and the path does not satisfy a hold delay requirement; and
wherein the CD bias is positive, and the applying the CD bias includes applying the positive CD bias to the single path segment in a manner such that the path satisfies the hold delay requirement.

11. The method of claim 1, wherein the path is a non-critical path; and
wherein the CD bias is negative, the applying the CD bias includes applying the negative CD bias to the path.

12. A computer program product that includes a non-transitory computer-readable medium, the medium having stored thereon instructions which, when executed by a processor, causes the processor to execute a method for designing an integrated circuit ("IC"), the computer program product comprising:
a placing module operable to place an IC design, wherein the IC design includes a first element, a second element, and a path coupling the first and second elements;
a routing module operable to route the IC design;
an extraction module operable to obtain at least one of resistivity data and capacitance data related to the path;
an analysis module operable to obtain timing data related to the path, the analysis module operable to determine whether the path is long or short and whether the path is setup-critical or hold-critical, the long path having more segments than the short path, wherein the analysis module operable to determine whether the path is long or shorts includes the analysis module determining whether the path has only one path segment extending from only a first element to only a second element and determining that the path is the short path when the path has only one path segment extending from only the first element to only the second element; and
a bias module operable to determine a critical dimension ("CD") bias to be applied to the path based upon at least one of the resistivity data, the capacitance data, and the timing data and based upon whether the path is determined short or long and whether the path is determined setup-critical or hold-critical, and apply the CD bias to the path,
wherein the CD bias is a first positive CD bias when the path is determined long and setup-critical,
wherein the CD bias is a first negative CD bias when the path is determined short and setup-critical,
wherein the CD bias is a second negative CD bias when the path is determined long and hold-critical, and
wherein the CD bias is a second positive CD bias when the path is determined short and hold-critical.

13. The computer program product of claim 12, further comprising a CAD data file module operable to encode data related to the CD bias to a CAD file.

14. The computer program product of claim 12, wherein the extraction module is operable to perform resistivity and capacitance extraction analysis on the IC design; and wherein the analysis module is operable to perform static timing analysis ("STA") on the path.

15. The computer program product of claim 12, wherein the path includes a plurality of metal elements;
wherein the placing module is operable to place the plurality of metal elements according to a 50-50 metal width to metal spacing design rule; and
wherein the routing module is operable to route the plurality of metal elements according to a 50-50 metal width to metal spacing design rule.

16. The computer program product of claim 12, wherein the path includes a metal element, a first path segment that couples the metal element to the first element, and a second path segment that couples the metal element to the second element;
wherein the path is determined the long path and the setup-critical path, and the path does not satisfy a setup delay requirement; and
wherein the CD bias is positive, and the bias module is operable to apply the positive CD bias to each of the first and second path segments and the metal element in a manner such that the path meets the setup delay requirement.

17. The computer program product of claim 12, wherein the path is a single path segment;
wherein the path is determined the short path and the setup-critical path, and the path does not satisfy a setup delay requirement; and
wherein the CD bias is negative, and the bias module is operable to apply the negative CD bias to the single path segment in a manner such that the path satisfies the setup delay requirement.

18. The computer program product of claim 12, wherein the path includes a metal element, a first path segment that couples the metal element to the first element, and a second path segment that couples the metal element to the second element;
wherein the path is determined the long path and the hold-critical path, and the path does not satisfy a hold delay requirement; and
wherein the CD bias is negative, and the bias module is operable to apply the negative CD bias to each the first and second path segments and the metal element in a manner such that the path satisfies the hold delay requirement.

19. The computer program product of claim 12, wherein the path is a single path segment;
wherein the path is determined the short path and the hold-critical path, and the path does not satisfy a hold delay requirement; and
wherein the CD bias is positive, and the bias module is operable to apply the positive CD bias to the single path segment in a manner such that the path satisfies the hold delay requirement.

20. The computer program product of claim 12, wherein the path is a non-critical path; and
wherein the CD bias is negative, and the bias module is operable to apply the negative CD bias to the path.

* * * * *